UNITED STATES PATENT OFFICE.

ELMER E. DOUGHERTY, OF BLOOMFIELD, NEW JERSEY.

TREATING LEUCITE-ROCK FOR THE EXTRACTION OF ALKALI AND ALUMINA CONTAINED THEREIN.

1,148,156.  Specification of Letters Patent.  Patented July 27, 1915.

No Drawing.  Application filed October 11, 1913. Serial No. 794,600.

*To all whom it may concern:*

Be it known that I, ELMER E. DOUGHERTY, a citizen of the United States, residing at Bloomfield, county of Essex, State of New Jersey, have invented certain new and useful Improvements in Treating Leucite-Rock for the Extraction of Alkali and Alumina contained therein; and I do hereby declare the following to be a full, clear, and exact description of the invention, such as will enable others skilled in the art to which it appertains to make and use the same.

The present invention relates to the treatment of leucite rock, and particularly to the leucite rock of the kind found in the State of Wyoming, for the extraction of the alumina and alkali contained therein, the alkali being present mainly in the form of potash.

It is well known that the potash and alumina present in leucite is soluble in hydrochloric acid, producing a sandy silicious residue which is easily washed. However, this reagent is an expensive one. I have found that the extraction of the potash and alumina can be accomplished by a mixture made up of sulfuric acid and a relatively small proportion of hydrochloric acid,—from 2% to 5% of hydrochloric acid being sufficient.

In carrying out my invention, I have found the following procedure to give the best results. The leucite is ground fine enough for the acids to act freely, and a quantity of sulfuric acid is added, at least sufficient to combine with the bases,—a slight excess being preferred. Hydrochloric acid is then added in the proportion of 2% by weight of the leucite. The mixture is then heated, as, for instance, upon a hot plate at a temperature somewhat above the boiling point of water, until the mass becomes pasty, the mass being constantly stirred during the heating operation. The heat is then increased until the remaining water is driven off, which occurs at a temperature corresponding to an incipient red heat (say 500° C.) At this heat, the hydrochloric acid is likewise driven off and also the excess $H_2SO_4$ and are recovered, as far as possible, by passing the hydrochloric acid vapors through the next charge which has already been mixed with its component part of sulfuric acid. The baked mass is lixiviated with boiling water, whereupon the potash and alumina go into solution as sulfates, and may be extracted from the solution in accordance with any of the well-known methods.

Instead of using hydrochloric acid as such, I may add to the ground leucite, a quantity of chlorid salt, such as common salt, equivalent to the amount of hydrochloric acid required. In this case, I increase the quantity of sulfuric acid, so as to furnish an amount sufficient to provide for the formation of the requisite quantity of hydrochloric acid from the salt added.

The advantages of the procedure constituting the invention are apparent. In the first place, better results are obtained with a cheaper acid. This I attribute principally to the fact that the leucite which is found in Wyoming is mixed with the mica known as phlogopite, which is not attacked by hydrochloric acid alone, or sulfuric acid alone, but which, under the conditions of treatment characteristic of my invention is attacked by sulfuric acid. So also, the lime contained in the leucite is converted into gypsum, which is relatively insoluble, and the iron is converted to such condition that it is also relatively insoluble. Both of these facts make the subsequent treatment of the solutions obtained by the lixiviation of the baked mass much easier, as will be apparent to those skilled in the art.

What I claim is:—

1. The method of recovering alkalis and alumina from leucite, which comprises heating the leucite with sulfuric acid in quantity sufficient to combine with the bases and in the presence of hydrochloric acid, thereby converting the alkalis and alumina into water-soluble form; substantially as described.

2. The method of recovering alkalis and alumina from leucite, which comprises heating the leucite with sulfuric acid in quantity sufficient to combine with the bases and in the presence of hydrochloric acid produced *in situ* within the mass; substantially as described.

3. The method of recovering alkalis and alumina from leucite, which comprises adding sulfuric acid to the leucite in quantity sufficient to combine with the bases, and, in the presence of hydrochloric acid heating the mixture until the mass becomes pasty and until the greater part of the water present has been driven off, then increasing the heat to drive off the remainder of the water and with it the hydrochloric acid, and finally recovering the water-soluble sulfates from the mass by lixiviation; substantially as described.

4. The method of recovering alkalis and alumina from leucite, which comprises adding sulfuric acid to the leucite in quantity sufficient to combine with the bases, and, in the presence of hydrochloric acid heating the mixture until the mass becomes pasty and until the greater part of the water present has been driven off, then increasing the heat to drive off the remainder of the water and with it the hydrochloric acid, and recovering the hydrochloric acid by passing the vapors through a new charge which has already been mixed with its component part of sulfuric acid; substantially as described.

In testimony whereof I affix my signature in presence of two witnesses.

ELMER E. DOUGHERTY.

Witnesses:
FRANZ A. RODY,
H. W. BURKEY.